Patented July 6, 1926.

1,591,272

UNITED STATES PATENT OFFICE.

HENRY BLUMENBERG, JR., OF LOS ANGELES, CALIFORNIA, ASSIGNOR TO STOCK-HOLDERS SYNDICATE, OF LOS ANGELES, CALIFORNIA, A CORPORATION OF CALIFORNIA.

PROCESS OF TREATING PHOSPHATE ROCK.

No Drawing.   Application filed August 7, 1925. Serial No. 48,876.

My invention relates to a process of treating phosphate rock, and has for its object, to provide a process that is simple, efficient and economic to decompose the phosphate rock to produce a fertilizing material, or if desired, to segregate the chemical compounds composing the final product.

In particular, my invention contemplates the treatment of phosphate rock with potassium chloride and ammonium sulphate, then treating the mixture in the presence of water with sulphur dioxide.

My invention consists in the steps of the process hereinafter described and claimed.

The phosphate rock $Ca_3(PO_4)_2$ is ground to a fineness preferably exceeding 100 mesh and is then mixed with water, potassium chloride, ammonium sulphate and subjected to sulphur dioxide, yielding as an end product, potassium sulphate, ammonium, di-hydrogen phosphate, calcium chloride and ammonium sulphite, the latter, however, oxidizing rapidly to ammonium sulphate.

The following equation indicates also the relative proportions of the reagents used in this process.

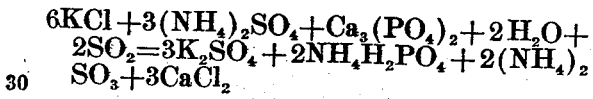

The reaction will be facilitated by carrying out the process under heat and pressure, 5 to 10 pounds per square inch being a suitable pressure.

The resulting product may be dried and will constitute a fertilizer. If the same is to be used as such, however, the product may be improved by heating the same to about 300° C. which will cause the calcium chloride to react with the ammonium phosphate, forming ammonium chloride, which is driven off in vapor form, the calcium radicle of the calcium chloride combining with the phosphate radicle of the ammonium phosphate, forming calcium hydrogen phosphate.

If desired the ingredients of the mass may be segregated by fractional crystallization or any other preferred method.

Various changes may be made in the steps of the process by those skilled in the art, without departing from the spirit of my invention, as claimed.

I claim:

1. A process of treating phosphate rock comprising mixing finely ground phosphate rock, ammonium sulphate and potassium chloride with water in the presence of sulphur dioxide.

2. A process of treating phosphate rock comprising mixing finely ground phosphate rock, ammonium sulphate and potassium chloride with water in the presence of sulphur dioxide under heat and pressure.

3. A process of treating phosphate rock comprising mixing finely ground phosphate rock, ammonium sulphate and potassium chloride with water in the presence of sulphur dioxide, heating the mixture to drive off water and the chlorine in the form of ammonium chloride.

In testimony whereof I have signed my name to this specification.

HENRY BLUMENBERG, JR.